United States Patent
Mannermaa

(10) Patent No.: US 7,151,793 B2
(45) Date of Patent: Dec. 19, 2006

(54) METHOD FOR SYNCHRONIZING A RECEIVER, A POSITIONING SYSTEM, A RECEIVER AND AN ELECTRONIC DEVICE

(75) Inventor: Jari Mannermaa, Salo (FI)

(73) Assignee: Nokia Corporation, Espoo (FI)

( * ) Notice: Subject to any disclaimer, the term of this patent is extended or adjusted under 35 U.S.C. 154(b) by 1048 days.

(21) Appl. No.: 09/732,828

(22) Filed: Dec. 8, 2000

(65) Prior Publication Data

US 2001/0004380 A1 Jun. 21, 2001

(30) Foreign Application Priority Data

Dec. 9, 1999 (FI) ................................. 19992653
Mar. 17, 2000 (FI) ................................. 20000634

(51) Int. Cl.
*H04B 1/707* (2006.01)
(52) U.S. Cl. .................................................... 375/150
(58) Field of Classification Search ................ 375/130, 375/145, 140–143, 149, 152, 364, 150, 354
See application file for complete search history.

(56) References Cited

U.S. PATENT DOCUMENTS

| 4,905,204 A | * | 2/1990 | Hughes ........................ 367/62 |
| 4,998,111 A | * | 3/1991 | Ma et al. ..................... 342/352 |
| 5,192,957 A | | 3/1993 | Kennedy ..................... 342/357 |
| 5,373,531 A | | 12/1994 | Kawasaki ....................... 375/1 |
| 5,686,683 A | * | 11/1997 | Freed ........................... 84/625 |
| 5,764,690 A | * | 6/1998 | Blanchard et al. ........... 375/147 |
| 5,812,090 A | | 9/1998 | Chevalier et al. ............ 342/378 |
| 6,463,043 B1 | * | 10/2002 | Shen et al. .................. 370/320 |
| 6,574,205 B1 | * | 6/2003 | Sato ............................ 370/335 |
| 6,606,349 B1 | * | 8/2003 | Kudhrethaya et al. ....... 375/150 |

FOREIGN PATENT DOCUMENTS

| EP | 0809376 A2 | 11/1997 |
| EP | 0971485 A1 | 1/2000 |
| FI | 102340 | 11/1998 |
| WO | WO 87/01540 | 3/1987 |
| WO | WO 97/14057 | 4/1997 |

OTHER PUBLICATIONS

"Digital Signal Processing", Ifeachor et al., pp. 183-250.
"Direct-Sequence Spread Spectrum Acquisition Using Transform Domain Processing", Thomas A. Brown et al., Oct. 11, 1993, pp. 1018-1022.

* cited by examiner

*Primary Examiner*—Kevin Burd
(74) *Attorney, Agent, or Firm*—Perman & Green, LLP

(57) ABSTRACT

A method for performing synchronization operations of a receiver to a received code-modulated spread spectrum signal whereby at least one reference code $(r(x))$ is used. This reference code corresponds to a code used in the modulation. The frequency shift of the received signal and the code phase of the code used in the modulation are determined in the method. Hartley transformers are also used.

31 Claims, 6 Drawing Sheets

Figure 1:
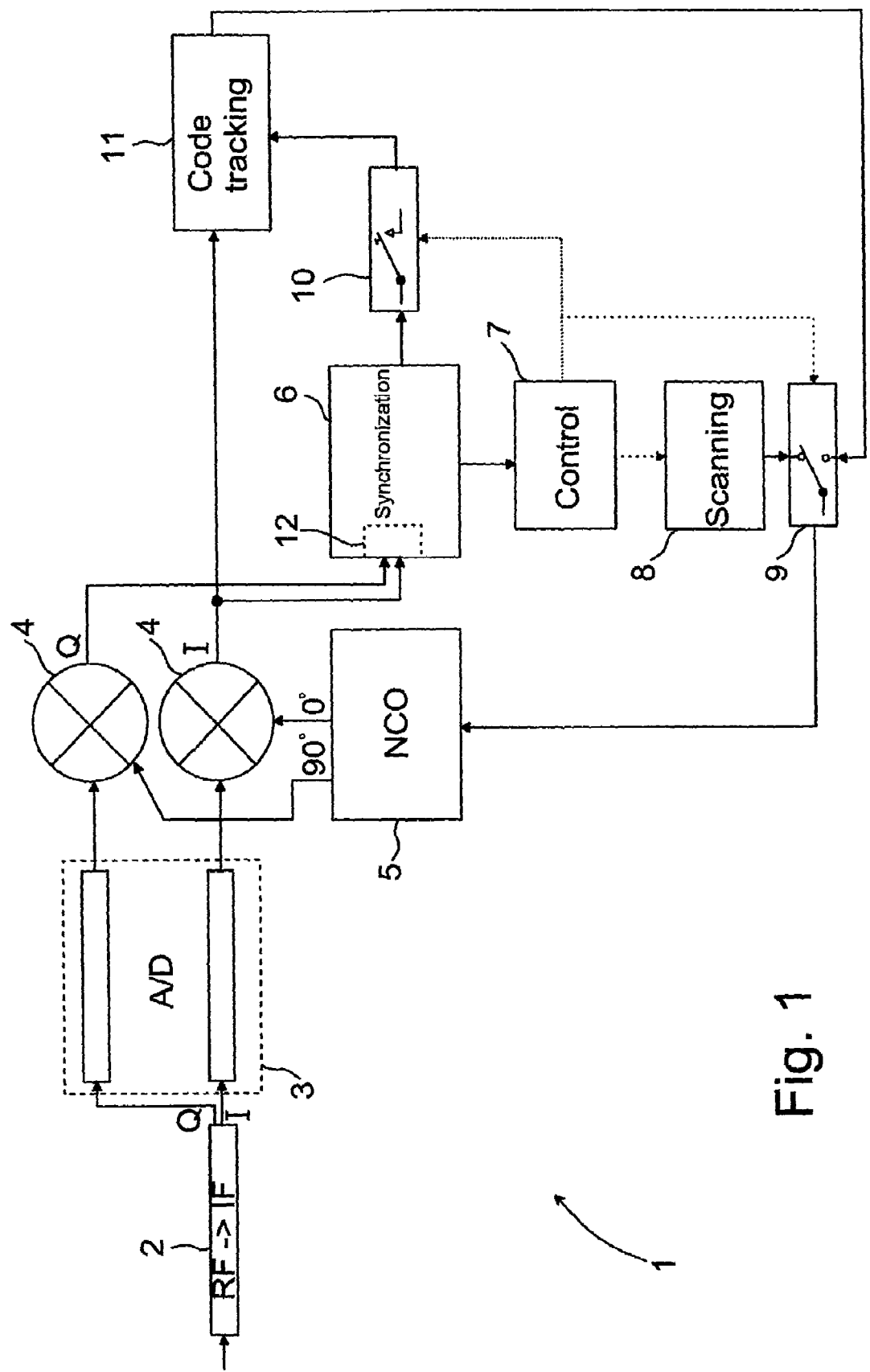

METHOD FOR SYNCHRONIZING A RECEIVER, A POSITIONING SYSTEM, A RECEIVER AND AN ELECTRONIC DEVICE

The present invention relates to a method according to the preamble of claim 1 for performing the synchronization operations of a receiver, a positioning system according to the preamble of claim 9, a receiver according to the preamble of claim 14, an electronic device according to the preamble of claim 22, and an electronic device according to the preamble of claim 29.

A well-known positioning system is the Global Positioning System, GPS, which now comprises over 20 satellites, 4 of which or more are simultaneously visible to a receiver. In Finland, for instance, it is possible to detect even more than 14 satellites simultaneously, depending on the latitude, due to the visibility over the North Pole. These satellites transmit, for instance, Ephemeris data and data of the satellite time. Normally, the receiver used in positioning determines its location by calculating the transit time to the receiver of a signal transmitted simultaneously from several satellites of the positioning system. For determining its location, the receiver must typically receive the signal of at least four visible satellites to be able to calculate the location.

Each satellite of the GPS system in operation transmits a so-called L1 signal at the carrier frequency of 1575.42 MHz. This frequency is also denoted $154f_0$, where $f_0=10.23$ MHz. In addition, the satellites transmit an L2 signal at the carrier frequency of 1227.6 MHz, or $120f_0$. In the satellite, these signals are modulated with at least one pseudo-random sequence. Each satellite has a different pseudo-random sequence. After the modulation, the signal is a code modulated wideband signal. The modulation technique used makes it possible for the receiver to distinguish between signals transmitted by different satellites, although the carrier frequencies used in the transmission are essentially the same. This modulation technique is called Code Division Multiple Access (CDMA). The pseudo-random sequence used in each satellite for the modulation of the L1 signal is, for instance, a so-called C/A code (Coarse/Acquisition code), an example of which is the Gold code. Each GPS satellite transmits a signal by using a unique C/A code. The codes are formed as the modulo 2 sum of two 1023-bit binary sequences. The first binary sequence G1 has been formed with the polynome $X^{10}+X^3+1$, and the second binary sequence G2 has been formed by delaying the polynome $X^{10}+X^9+X^8+X^6+X^3+X^2+1$ so that each satellite has a different delay. This arrangement enables generating different C/A codes with a similar code generator. The C/A codes are binary codes, the chipping rate of which in the GPS system is 1.023 MHz. The C/A code comprises 1023 chips, whereby the repeating time of the code, epoch, is 1 ms. The carrier wave of the L1 signal is further modulated with navigation information at a bit rate of 50 bit/s. The navigation information comprises information about the "health", orbit and time of the satellite, for instance.

The satellites monitor the condition of their equipment during operation. For example, the satellites can use so-called watch-dog functions to detect errors in the equipment and notify about them Errors and malfunctions can be either momentary or long-term in nature. On the basis of the health information, some of the errors can be possibly compensated for, or the information transmitted by a malfunctioning satellite can be entirely ignored. In addition, in a situation where the signal of more than four satellites can be received, the information received from different satellites can be emphasized in different ways on the basis of the health information. Thus it is possible to minimize errors that satellites which seem to be unreliable may cause in the measurements.

In order to detect the signals of the satellites and to identify the satellites, the receiver must perform synchronization, whereby the receiver seeks out the signal of each satellite each time and tries to synchronize with this signal so that the data transmitted with the signal can be received and demodulated.

A location determination receiver must carry out synchronization when, for instance, the receiver is switched on, and also in a situation where the receiver has not been able to receive the signal of any satellite for a long time. In portable devices, for example, a situation like this can arise easily, because the device is moving, and the antenna of the device is not always in an optimal position in relation to the satellites, which weakens the strength of the signal coming to the receiver. In city areas, buildings have a blocking effect on the received signal, and in addition, the signal can proceed to the receiver along several different routes, such as straight from the satellite (line-of-sight) and as reflected from buildings. As a result of this multipath propagation, the same signal is received as several signals in different phases.

The positioning arrangement has two main functions:
1. calculating the pseudorange of the receiver to different GPS satellites, and
2. determining the location of the receiver using the calculated pseudoranges and the location information of the satellites. The location information of the satellites at any given moment can be calculated on the basis of the Ephemeris and time correction information received from the satellites.

The distances to the satellites are called pseudoranges, because the time is not known accurately in the receiver. Because the time is not known with an absolute accuracy, the location and time must be determined preferably by iterating the measured data with a linearized equation group. Then the determination of the location and time is repeated, until a sufficient accuracy of time and location has been achieved.

The calculation of the pseudorange can be carried out by measuring the mutual, apparent transit time delays of the signals of different satellites. After the receiver has become synchronized with the received signal, the information transmitted in the signal is detected.

Almost all known GPS location determination receivers (GPS navigation receivers) use correlation methods for carrying out synchronization functions, i.e. code acquisition and/or maintaining synchronization (tracking). The reference codes r(x) or pseudo random sequences of different satellites have been saved or are generated locally in the location determination receiver. A down conversion is performed on the received signal, whereafter the receiver multiplies the received signal with the saved pseudo random sequence. The signal formed as the result of the multiplication is integrated or low-pass filtered, whereby the result tells if the received signal contained a signal transmitted by the satellite. The multiplication carried out in the receiver is repeated so that each time the phase of the pseudo random sequence saved in the receiver is shifted. The right phase is concluded from the correlation result preferably so that when the correlation result is the highest, the right phase has been found. Then the receiver is correctly synchronized with the received signal.

After the synchronization with the code has been performed, the frequency is adjusted and phase locking is carried out. This correlation result also expresses the information transmitted in the GPS signal.

The above mentioned synchronization and frequency adjustment process must be repeated on each signal of a satellite which is received in the receiver. Therefore, this process consumes a lot of time especially in a situation where the received signals are weak. In order to make this process faster, several correlators are used in some prior art receivers, whereby more correlation peaks can be searched for simultaneously. Only by increasing the number of correlators it is not possible to make the synchronization and frequency adjustment process much faster in practical applications, because the number of correlators cannot be increased to infinity.

Some prior art GPS receivers use the FFT technique for determining the Doppler shift of the received GPS signal in connection with ordinary correlators. In these receivers, correlation is used to reduce the bandwidth of the received signal to 10 kHz–30 kHz. This narrow-band signal is analyzed with FFT algorithms to determine the carrier frequency.

A GPS receiver and a method for processing GPS signals have been presented in the international patent application WO 97/14057. The receiver presented in this specification comprises two separate receivers, of which the first receiver is intended for use in a situation where the strength of the receiver signal is sufficient, and the second receiver is intended for use in a situation where the strength of the received signal is not sufficient for a sufficiently accurate location determination when the first receiver is used. In this second receiver, the received signal is digitized and saved in memory media, whereby these saved signals are later processed in a digital signal processing unit. The digital signal processing unit performs convolution operations to the received, digitized signal. The purpose of these convolution operations is to calculate pseudoranges. The number of PM frames saved in the memory media is typically from one hundred to one thousand, which corresponds to a signal of the length of 100 ms to 1 s. After this, a saved code corresponding to the code of the satellite to be examined is retrieved from the memory of the receiver to be used for analyzing the received signal.

The Doppler shift is also removed in the receiver. The amount of this Doppler shift has been determined either with the first receiver or on the basis of information received from a base station of the GPS system. After this, a coherent summing of consecutive frames is performed. A fast Fourier transformation is performed on the data set received as the result of this summing. A multiplication is performed on the Fourier transformation result, using the complex conjugate of the Fourier transformation of the reference signal saved in the memory media as one multiplier. An inverse Fourier transformation is further performed on the result of this multiplication, whereby a number of correlation results are received. In this specification, correlation has been replaced by a Fourier transformation, whereby the number of calculations has been reduced. According to the specification, the method makes location determination 10 to 100 times faster as compared to the solutions known at the time of filing the specification.

Matched filters are used in some prior art receivers for the locking and tracking of the signal. However, the use of matched filters entails the drawback that they consume a relatively high amount of power, which limits the use of matched filters especially in mobile devices.

It is an objective of the present invention to provide a receiver, in which synchronization with the transmitted signal can be performed substantially faster than in the prior art receivers. The invention is especially suitable for use in location determination receivers, but also in other receivers, preferably in CDMA receivers, in which the receiver must become synchronized with a spread spectrum signal. The invention is based on the idea that the time-to-frequency conversions and the inverse or frequency-to-time conversions are performed with a fast Hartley conversion and a corresponding inverse conversion. Thus the corresponding calculations can be performed faster than in the prior art solutions, such as systems based on FFT transformations. The method according to the present invention is characterized in what is set forth in the characterizing part of claim 1. The positioning system according to the present invention is characterized in what is set forth in the characterizing part of claim 9. The receiver according to the first preferred embodiment of the present invention is characterized in what is set forth in the characterizing part of claim 14. The electronic device according to the present invention is characterized in what is set forth in the characterizing part of claim 22. The electronic device according to the second preferred embodiment of the present invention is further characterized in what is set forth in the characterizing part of claim 29.

The present invention provides considerable advantages as compared to the prior art methods and receivers. With the method according to the invention, the conversions can be performed faster and with lower power consumption as compared to, for example, FFT-based systems. Especially in location determination receivers, it is thus possible to make it faster for the receiver to become synchronized with the received signal. In addition, the real-time time-to-frequency and frequency-to-time conversion according to the invention can be implemented with a semiconductor circuit of a substantially smaller area than in the prior art solutions. The method according to the invention provides a substantial improvement of the synchronization speed as compared to the prior art methods. The total energy consumption of the receiver according to the invention can be kept reasonable, which makes the invention especially suitable for use in portable devices. Thus the location determination receiver can also be implemented in connection with a mobile station.

Figure 2:
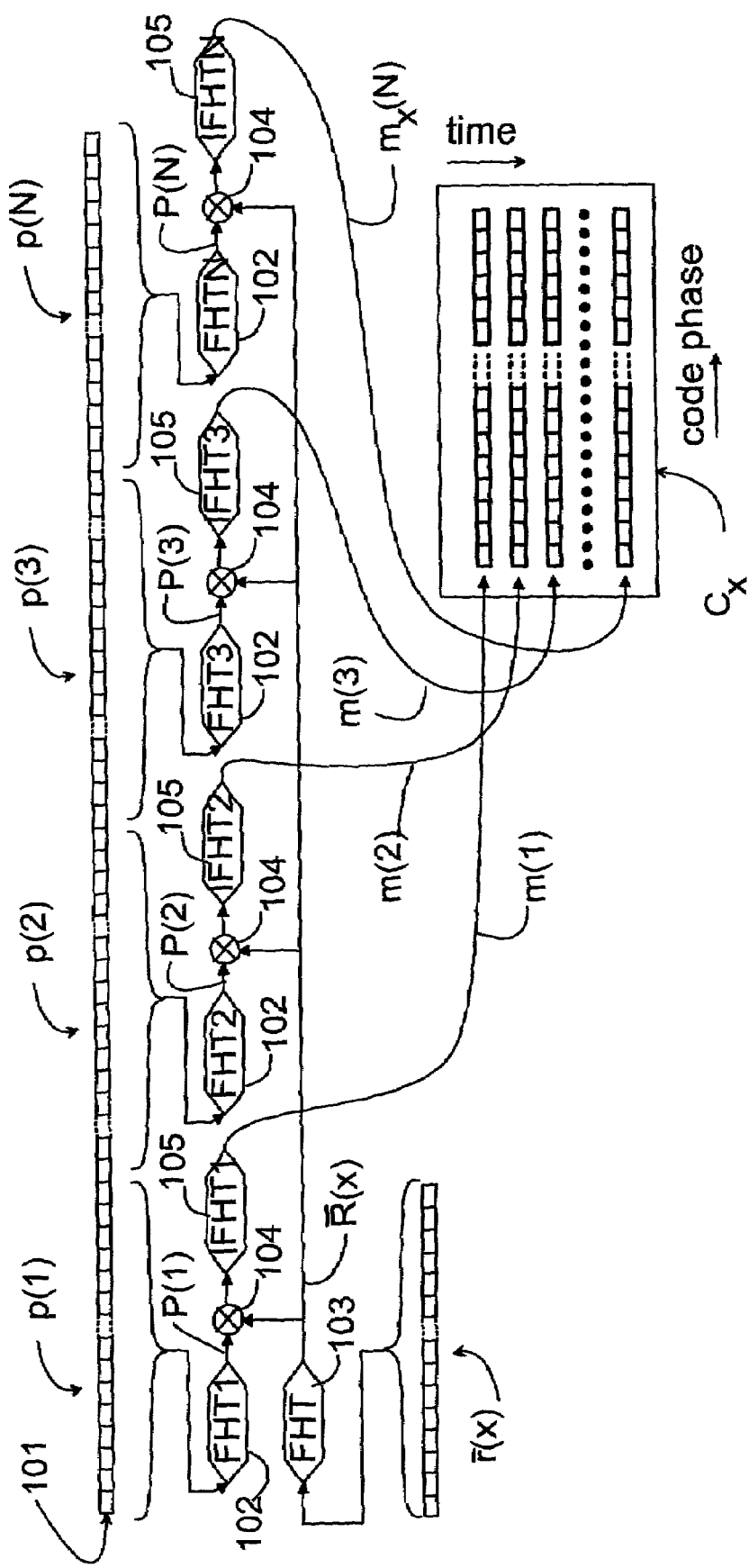
Figure 3:
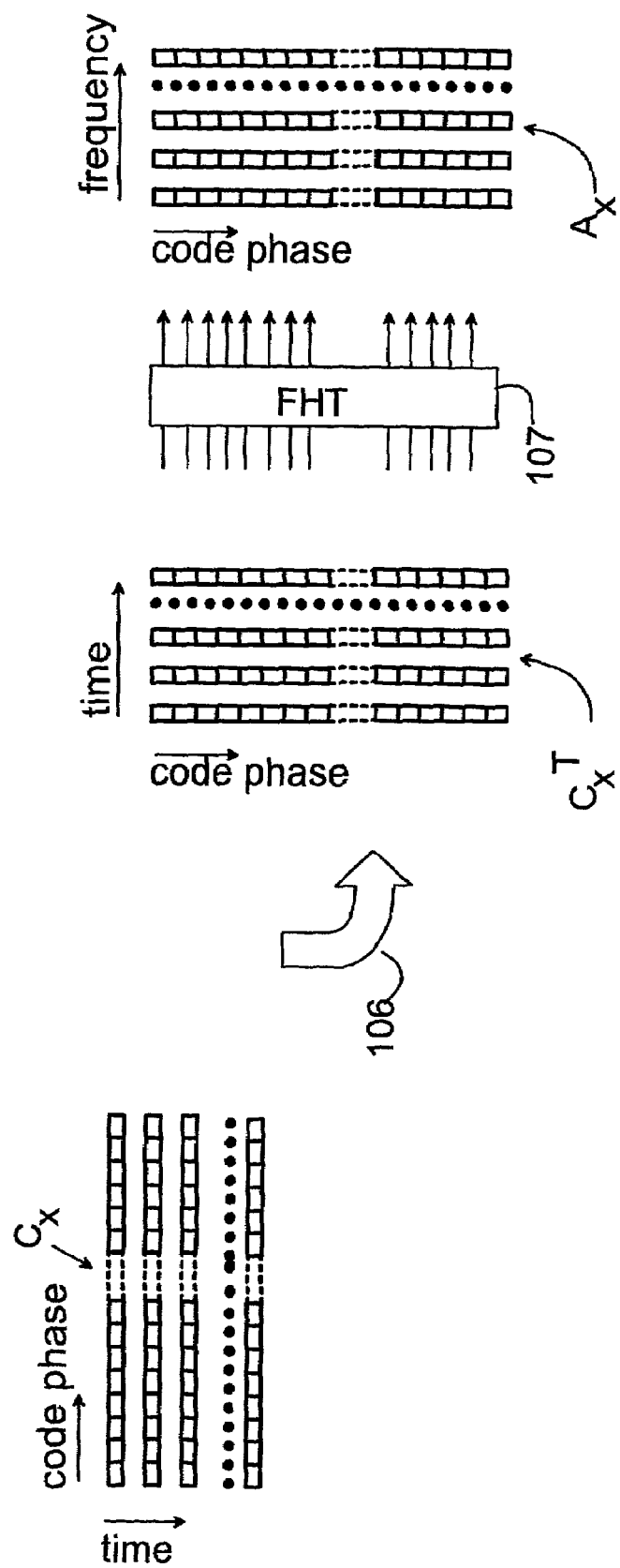
Figure 4:
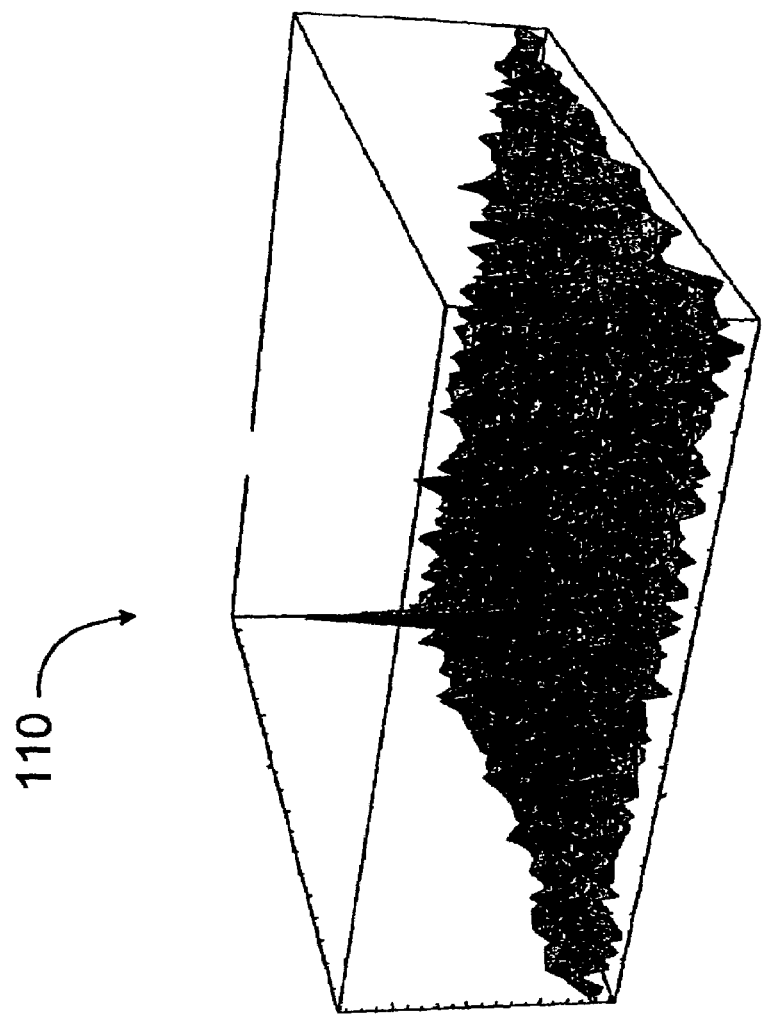
Figure 4:
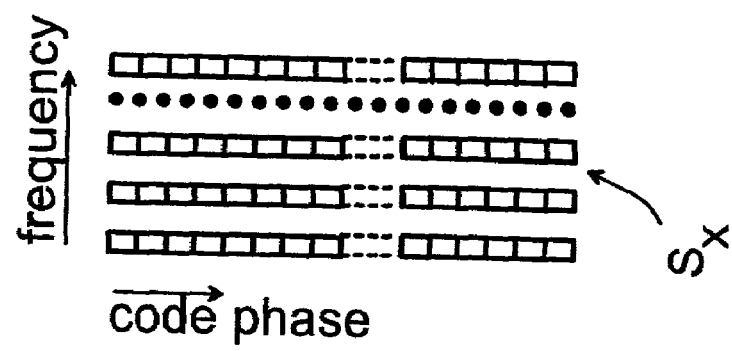
Figure 5:
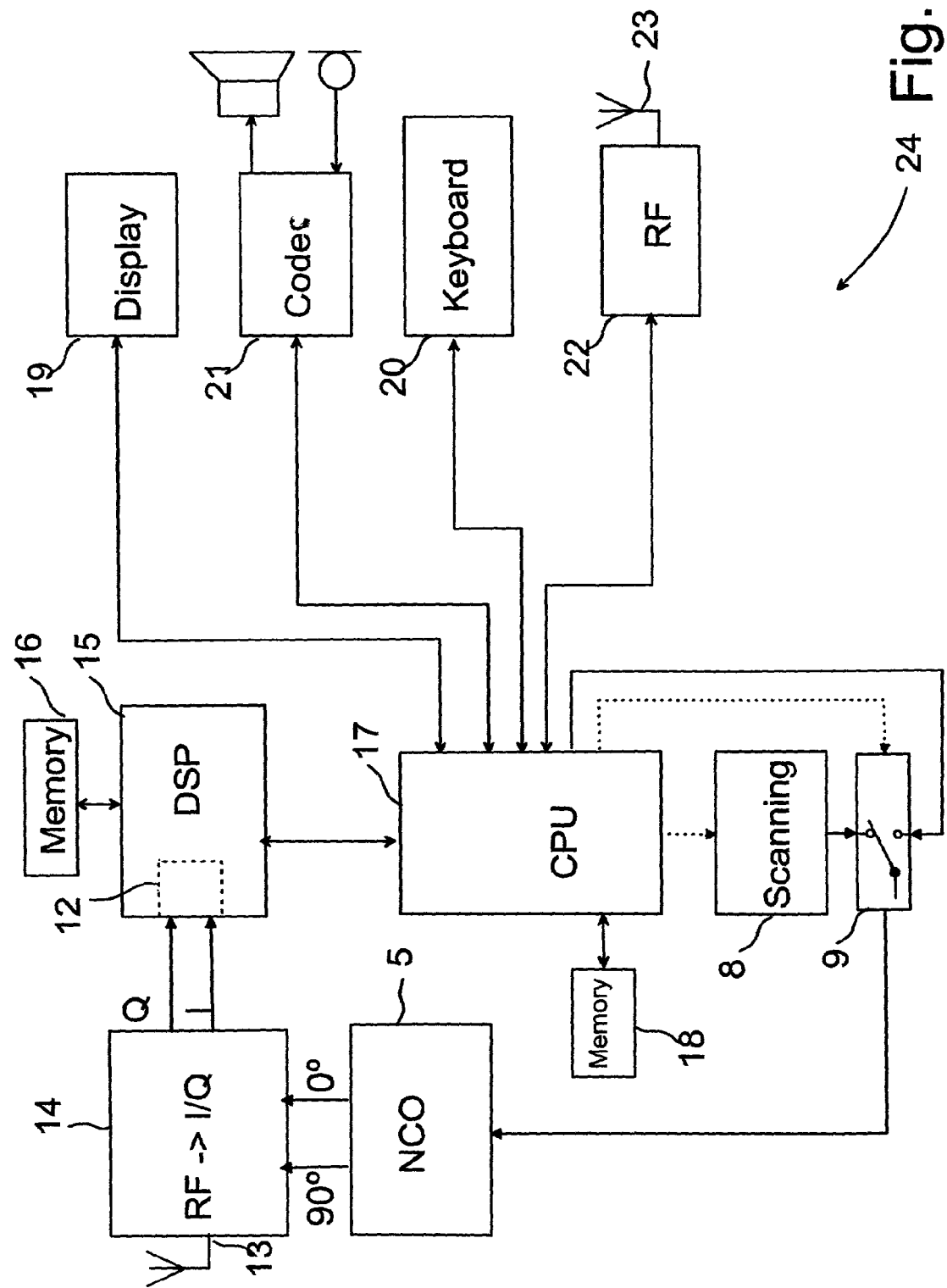
Figure 6:
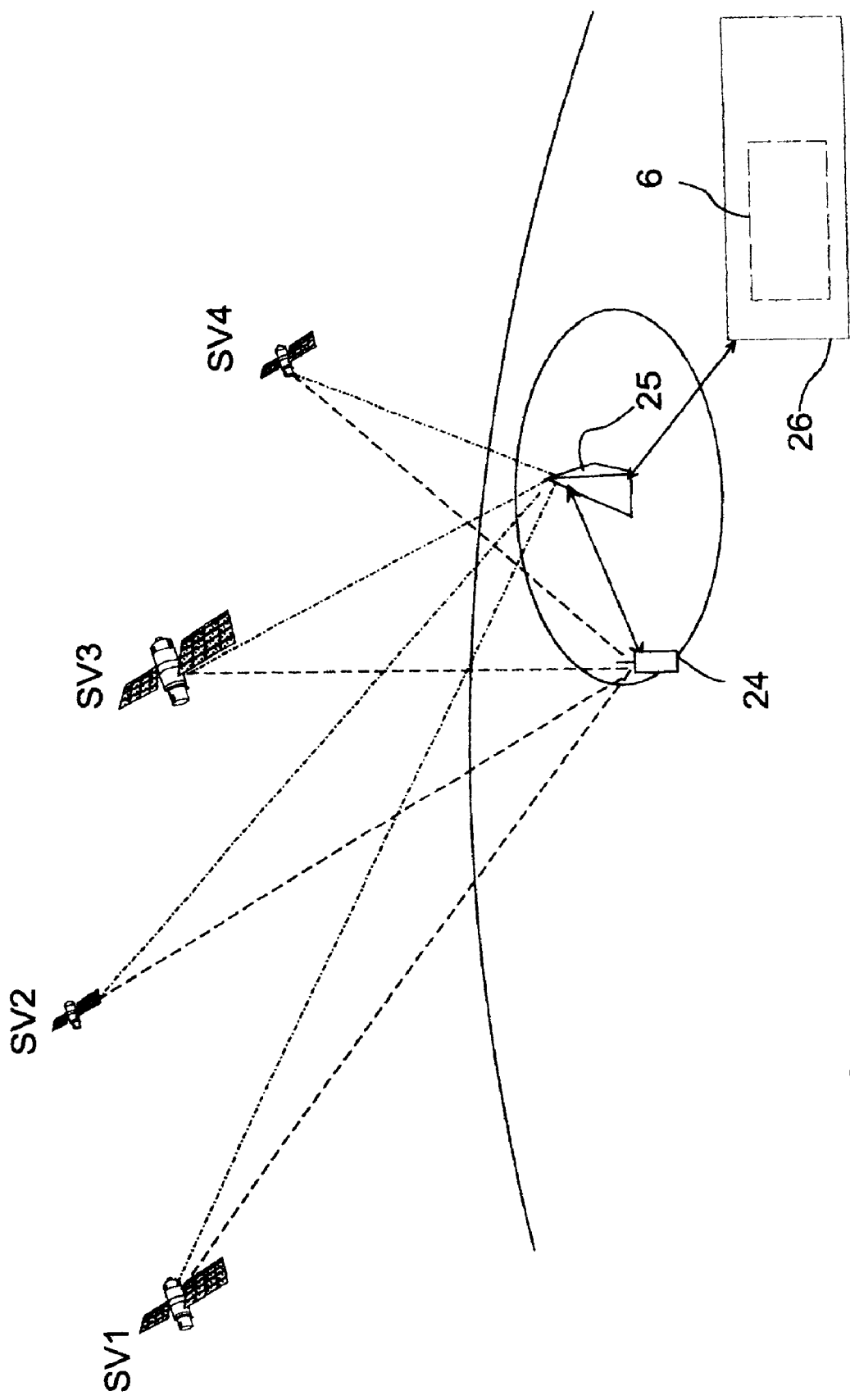

In the following, the present invention will be described in more detail with reference to the accompanying drawings, in which FIG. 1 is a simplified block diagram of a receiver, in which the method according to the invention can be applied, FIG. 2 shows the correlation step of a method according to a preferred embodiment of the invention as a simplified diagram, FIG. 3 shows the analysis step of a method according to a preferred embodiment of the invention as a simplified diagram, FIG. 4 shows the acquisition step of a method according to a preferred embodiment of the invention as a simplified diagram, FIG. 5 shows an electronic device according to a preferred embodiment of the invention as a simplified block diagram, and FIG. 6 illustrates the principle of a positioning system according to a preferred embodiment of the invention as a simplified diagram.

In the following, the invention will be described using a GPS receiver according to FIG. 1 as an example. The properties of the Hartley transform and inverse Hartley transform applied in the method will be described at first. The Hartley transform can be presented with the formula:

$$H(f) = \sum_{k=0}^{M-1} x(kt_0) \cdot [\cos(2\pi f k t_0 / M) + \sin(2\pi f k t_0 / M)] / M \quad (1)$$

and the inverse Hartley transform can be presented with the formula:

$$x(t) = \sum_{k=1}^{M-1} H(k f_0) \cdot [\cos(2\pi k f_0 t / M) + \sin(2\pi k f_0 t / M)] \quad (2)$$

where x(k) are the measured samples in the time domain,
M is the number of samples,
$t_0$ is the sampling interval, and
$f_0$ is $1/[(M-1)t_0]$ According to the formulas presented above, $N^2$ calculations are needed to calculate a discrete Hartley transform. However, this number can be reduced by means of permutations known from the theory of mathematical conversions and the so-called Butterfly process, whereby the conversions can be carried out with $N\log_2 N$ calculations. This conversion is then called a fast Hartley transform, FHT. On the basis of the properties of the Hartley transform, convolution in the time domain can be performed in the frequency domain by means of multiplications and additions as follows:

$$x_1(t)*x_2(t) = H_1(f) \cdot H_{2e}(f) + H_1(-f) \cdot H_{2o}(f) \quad (3)$$

where $x_1(t)$ and $x_2(t)$ are the signals on which convolution is performed,
$H_1(f)$ and $H_2(f)$ are the $x_1(t)$ and $x_2(t)$ Hartley transforms, respectively, and
$H_{2e}(f)$ and $H_{2o}(f)$ are the even and odd transformation of the
Hartley transform of the signal $x_2(t)$, respectively.

If at least one signal of the convolution is odd or even, it follows that the convolution equation is simplified to the form $H_1(f) \cdot H_2(f)$. The above described convolution can be utilized when calculating, for example, the correlation between two signals. In order to calculate correlation by means of convolution, either of the signals is turned to its mirror image in the time domain, and the convolution is preferably calculated by using the above described Hartley transforms. This will be described later in this specification.

The operation of a receiver 1 according to the first preferred embodiment of the invention will be discussed in the following. In the receiver 1, the received signal is preferably converted to an intermediate frequency in the converter block 2. At this stage, as is well known, the signal comprises two components, I and Q, between which there is a phase difference of 90°. These analog signal components, which are converted to the intermediate frequency, are digitized in the digitizing block 3 and conducted to the multiplier block 4. In the multiplier block 4, the I and Q components of the digitized signal are multiplied with the signal generated by the Numerically Controlled Oscillator (NCO) 5. This signal of the numerically controlled oscillator 5 is intended to correct the frequency deviation caused by the Doppler shift and the frequency error of the local oscillator (not shown) of the receiver 1. The signal formed by the multiplier block 4 is led to the synchronization block 6, in which the method according to the invention is applied. This synchronization block 6 thus tries to establish the code phase and frequency deviation of the satellite, which are to be used in functions after the synchronization. This will be discussed later in this specification. The scanning block 8 is controlled with the control block 7 during synchronization, and the scanning block 8 is used to regulate the frequency of the numerically controlled oscillator 5 when required. The control block 7 controls the first switch 9 to switch either the signal formed by this scanning block 8 to the numerically controlled oscillator 5 during synchronization or the control signal formed by the code tracking block 11 to the numerically controlled oscillator 5 when synchronization has been achieved. A second switch 10 is used to control the operation of this tracking block 11. This tracking block 11 forms a part of a code phase locked loop and a carrier phase locked loop, which are known as such (not shown).

After switching the operating voltages on or in a situation where the receiver 1 has not been able to receive a signal of the GPS satellites for a long time, a two-dimensional search step is preferably carried out in the receiver 1 for each satellite to which signal reception is targeted. In this two-dimensional search step, the purpose is to determine the carrier frequency and code phase of each satellite. This carrier frequency is influenced by the Doppler shift caused by the movement of the satellite, the multipath propagation and the inaccuracies of the local oscillator of the receiver. The frequency inaccuracy can be rather high, as much as ±6 kHz, in which case the receiver 1 must search from the frequency band of approx. 12 kHz in relation to the actual transmission frequency (L1=1575.42 MHz). The receiver 1 does not know the exact code phase, either, and hence the receiver must also determine the code phase from 1023 possible code phases. This results in a two-dimensional search process, in which one dimension is a frequency deviation in the band of 12 kHz, and the other dimension is a code phase out of 1023 different code phases. In a method according to a preferred embodiment of the invention it is possible to examine a frequency band of approx. 500 Hz at a time, and hence the method is repeated 24 times when required, to cover the whole frequency band of 12 kHz to be examined. Obviously the values used in this specification only serve as examples which clarify the invention, but do not constitute a limitation thereof. The invention can also be applied in other than GPS systems, in which case the frequency values, code phases and the number of codes can vary.

The operation of a method according to the first preferred embodiment of the invention in the receiver 1 according to FIG. 1 will be described in the following. In order to start synchronization, the scanning block 8 sets the frequency of the numerically controlled oscillator 5 such that the receiver 1 advantageously receives the lowest frequencies of the frequency band, 1575.414 MHz–1575.4145 MHz in this example. The receiver can also specify the starting frequency so that the receiver utilizes previously determined location information and/or almanac information, whereby the location determination can be made even faster. Samples of the received signal are saved in the sample vector formation block 12 preferably as complex sample vectors p(1), p(2) ... p(N), each of which includes 1023 samples in this preferred embodiment. In this preferred embodiment, the sample saving frequency of the sample vector formation block 12 is essentially the same as the chipping rate of the chips, which is approx. 1 023 000 samples per second. The sample vectors are continuous so that the next sample vector continues temporally after the previous sample vector, or the time interval between the last sample of the sample vector and the first sample of the next sample vector is essentially the same as the time interval between consecutive samples of the sample vector. These 1023 samples thus correspond to a signal of 1 ms, and hence in a time-to-frequency transformation the frequency band is 1 kHz, which can be partly utilized. The sample vector formation step is denoted with the reference number 101 in FIG. 2 in this specification.

The number of sample vectors is preferably N. In addition, the formation of sample vectors can be repeated. When the value of the number N of sample vectors $p(1), p(2) \ldots p(N)$ is determined in the GPS system, it must be taken into consideration that information has been modulated on to the signal at a bit rate of 50 bits/s as binary phase modulation. Another factor, which limits this number N of the sample vectors $p(1), p(2) \ldots p(N)$, is the frequency stability of the local oscillator of the receiver.

In addition to the sample vector formation step, the synchronization method according to the invention also comprises a correlation step for forming a correlation function matrix.

This correlation step can be partly performed already during sampling, or after N sample vectors $p(1), p(2) \ldots p(N)$ have been formed. If the correlation step is performed in such a manner, for instance, that a time-to-frequency transformation is calculated for each sample vector after it has been saved, preferably with a fast Hartley transform (FHT), the same time-to-frequency transformer can be used in all N sample vectors $p(1), p(2) \ldots p(N)$. But if the correlation step is performed after the saving of N sample vectors, a separate time-to-frequency transformer must be used for each sample vector, or the time-to-frequency transforms are performed for different sample vectors consecutively in the same time-to-frequency transformer.

FIG. 2 shows the correlation step of the method, in which a correlation function matrix $C_x$ is formed of the sample vectors $p(1), p(2) \ldots p(N)$.

A discrete Hartley transform 102, most suitably a fast Hartley transform, FHT, is performed on each sample vector $p(1), p(2) \ldots p(N)$.

$$P(i)=FHT(p(i)), \text{ where } i=1, \ldots, N \quad (4)$$

This is illustrated by the blocks, FHT, . . . FHTN in FIG. 2. The number of values used in calculations is preferably 1024, because then the discrete Hartley transform can be implemented in practical applications much more efficiently (with an FHT algorithm) than when 1023 values are used. One way of doing this is to add an extra null as the 1024th element. This has an insignificant effect on the transformation result.

The reference codes r(x) corresponding to the C/A code of all the satellites of the GPS system are preferably saved in the receiver, whereby x refers to the satellite identifier and is, for example, in the range 1–30. It is not necessary to save the reference codes, but they can also be generated in the receiver. The reference code, which is selected or generated in the correlation step, is the reference code of the satellite transmitting the signal with which the receiver is being synchronized at any given time. The reference code is temporally inverted. This inverse reference code, which is denoted with $\bar{r}(x)$ in FIG. 2, is treated with a discrete Hartley transform 103, most suitably a fast Hartley transform:

$$\bar{R}(x)=FHT(\bar{r}(x)) \quad (5)$$

The inverse reference code $\bar{r}(x)$ and/or its FHT transformation has often been saved in the memory media of the receiver in advance, but it can be formed of the reference code r(x) in connection with synchronization.

A multiplication 104 between the Hartley transform result P(i) of each sample vector p(i) and the Hartley transform $\bar{r}(x)$ of the inverse reference code $\bar{R}(x)$ is performed next in the correlation step.

$$M_x(i)=\bar{R}(x) \cdot P(i) \quad (6)$$

Finally, an inverse Hartley transform 105 (IFHT) is performed on the results of these multiplications, resulting in a cross-correlation of the reference code r(x) and the received signal with all possible integer delays (1023).

$$m_x(i)=iFHT(M_x(i)) \quad (7)$$

This is based on the above mentioned fact that the Hartley transform of the convolution of the time domain signals corresponds to the multiplication of the Hartley transforms of the time domain signals. When an inverse reference code is also used, it is possible to perform a fast discrete-time correlation with the Hartley transformation. In this preferred example, the correlation result then comprises 1023 elements. The cross-correlation results $m_x(i)$ formed of these different sample vectors p(i) are used to form a correlation function matrix $C_x$, in which the number of rows is the number N of sample vectors.

It is obvious that instead of temporal inversion of the reference code, it is possible to form inverse sample vectors $\bar{p}(i)$ of the sample vectors p(i), in which case the reference code r(x) is used as direct and the sample vectors are used as inverse in the calculations presented above. In a preferred embodiment, it is not necessary to perform either of the inversions mentioned above, but the reference code r(x) and the sample vectors p(i) can be used directly.

The rows of a correlation function matrix $C_x$ formed in the correlation step show the cross-correlation of the received signal and the reference code with different phase differences at the intervals of one millisecond. As a formula, the correlation function matrix can then be expressed as follows:

$$C_x = \begin{bmatrix} m_{x,k}(1) \\ m_{x,k}(2) \\ \vdots \\ m_{x,k}(N) \end{bmatrix} \quad (8)$$

At the next or analysis phase, the transpose 106 of the correlation function matrix $C_x$ is used; in the transpose the rows represent the signal samples in the time domain in the same manner as in a prior art correlator. Each row corresponds to a certain code phase difference between the received signal and the reference code. A Hartley transform 107 is performed on each row of the transpose of this correlation function matrix $C_x$ for forming a coherent search matrix $A_x$, whereby a frequency analysis can be performed for determining the real frequency shift. This is illustrated by FIG. 3.

$$A_x=FHT(C_x^T) \quad (9)$$

In practical applications, it is not necessary to form a transposed matrix from the correlation function matrix in a separate step, but the elements of the saved correlation function matrix $C_x$ are read from the memory 16 (FIG. 5) in a different direction, preferably by columns.

If necessary, an incoherent summing step can be performed in the synchronization block 6 to improve the signal-to-noise ratio. In order to implement the incoherent summing step, the sample vector formation step, the correlation step and the analysis step described above are repeated K times (not shown). This number of repetitions K is preferably selected such that the signal-to-noise ratio can be improved sufficiently, but in a reasonable time.

The values of the elements $a_x(i,j)$ of the search matrix $A_x$ are examined in the acquisition step, and the objective is to find 110 a value, which exceeds the threshold value set in advance and is clearly higher than the other values. If a value like this is found, it expresses the code phase difference and frequency deviation, because it is probably a signal transmitted by a satellite. If the signal is not transmitted by a satellite, but consists of noise or other incidental spurious signals, no remarkable correlation peaks should arise. The code phase difference is seen from the row index of this highest value, and correspondingly the frequency deviation is seen from the column index. The example of FIG. 4 illustrates a situation where a value, which is clearly higher than the other values, has been found. If no such value is found in the search matrix $A_x$, which means that a signal transmitted by the satellite searched for was probably not received in the frequency range examined, the frequency range to be examined is changed, and the above mentioned steps are carried out for forming a search matrix. With this method, the whole band of 6 kHz can be examined by repeating the steps described above as many times as required.

When required, the steps described above can be repeated for the whole frequency range to be examined, and the search matrices formed at different times of repetition or only the possible peaks can be saved before searching for the highest correlation peak. Then the possibility of false interpretations can be reduced in such a situation, for instance, that the threshold value has been set too small and a spurious signal can cause a false interpretation.

After the right frequency deviation and code phase have been determined, the receiver can be set to the tracking mode. Reception of data is not successful with weaker signals, and data received via the mobile phone network, for example, must be used instead, which is a situation known as such. Range measurement is still possible with lower accuracy. The tracking mode is set by changing the switches (FIG. 1) to another position, whereby the received information is led to the tracking block 11, in which a feedback is also formed for the fine adjustment of the frequency of the numerically controlled oscillator 5.

For calculating the location, the receiver performs the signal reception preferably on the basis of signals received from at least four satellites. Then the synchronization described above is repeated when required for the signal of each satellite, and the code of the satellite with which synchronization is performed is selected as the reference sequence $r(x)$ at each time.

Most of the blocks needed in the implementation of the method according to the first preferred embodiment of the invention can be implemented in the digital signal processor (not shown), for example. Either hardware-based solutions or software implementations of the digital signal processing unit can be used in the performance of FHT transformations. In addition, a control element, preferably a microprocessor or the like can be used to control the operation of the receiver.

Using a Hartley transform as the time-to-frequency and frequency-to-time transformation also provides the advantage that the same algorithm can be used in both transformations, which can be seen by comparing the formulas (1) and (2). In a hardware-based solution, the electronics required by the transformations can be implemented with either a circuit area reduced by about a half (an ASIC circuit, for instance) and half lower power consumption than a corresponding implementation with a Fourier transform and about the same processing time, or with a circuit area of the same size and the processing speed even doubled.

The transformation results $H(f)$ of the Hartley transforms can also be used to calculate the amplitude spectrum and power spectrum of the signal. The amplitude spectrum can be calculated with the formulas:

$$X_{REAL}=H(f)+H(N-f) \text{(real part)} \tag{10}$$

$$X_{IMAG}=H(f)-H(N-f) \text{(imaginary part)} \tag{11}$$

The power spectrum can be calculated with the formula:

$$S=[H(f)^2+H(N-f)^2]/2 \tag{12}$$

An electronic device 24 according to a preferred embodiment of the invention, which comprises a mobile station and a location determination receiver, is shown in FIG. 5. The first antenna 13 is used for the reception of the signal transmitted by the positioning satellites. The received signal is led to the first radio part 14, in which the signal is down-converted and digitized. The first radio part comprises, among other things, the transformation block 2, digitizing block 3 and multiplier block 4 of the receiver shown in FIG. 1. The digitized signal, which at this stage preferably comprises the I and Q components, is led to the digital signal processing unit 15, in which, among other things, sample vectors are formed in the sample vector formation block 12. Samples are saved in the first memory media 16, which comprise, for instance, read/write memory and preferably also read memory and/or non-volatile read/write memory for saving the program code of the digital signal processing unit 15. In this embodiment, the signal processing unit 15 also comprises operations of the synchronization block 6, for instance, such as the formation of the correlation function matrix $C_{x,k}$ with, for example, Hartley transformers FHT, . . . FHTN and/or matched filters. The digital signal processing unit 15 preferably also includes the formation of a coherent search matrix $A_x$ and the performance of an acquisition step. The digital signal processing unit 15 transmits information about the calculated phase difference and frequency deviation to the processor block 17, which comprises, for example, a microprocessor and I/O logic. The processor block 17 controls the scanning block 8 and the first switch 9. The tracking block 11 is preferably at least partly implemented as program instructions of memory and program memory of the processor block. The second memory media 18 are used as the data memory and program memory of the processor block 17. It is obvious that the first memory media 16 and the second memory media 18 can also comprise common memory. Location determination information can be shown to the user on the display 19.

Operations of the mobile station have also been implemented in the application software of the processor block 17. The display 19 can then be used for showing telephone call information in a manner known as such. With the keyboard 20, the user can control the location determination receiver and the mobile station. The coding and decoding of audio signals is performed by means of a codec 21. The radio part 22 and the second antenna 23 of the mobile station are also shown in FIG. 5.

In the method according to the first preferred embodiment of the invention described above, location determination was performed in connection with the receiver. In a method according to another preferred embodiment of the invention, at least part of the location determination calculation is performed in connection with the data transfer network. A data transfer network can comprise a mobile communication network, for example. In that case, a calculation server 26 (FIG. 6) or a corresponding unit suitable for location determination calculation has been arranged in a data transfer connection in the data transfer network. One possible location for the calculation server is a base station 25 of the mobile communication network, but other alternative locations can also be applied in connection with the present invention.

The operation of a method according to another preferred embodiment of the invention in an electronic device according to FIG. 5 and a system according to FIG. 6 will be described in the following. In this method, the operations performed are essentially the same as in the receiver 1 according to the first preferred embodiment of the invention, and thus only the main features of the method will be described in the following. In order to start synchronization, the scanning block 8 sets the frequency of the numerically controlled oscillator 5 such that each time the frequencies wanted are received with the receiver 1. Samples of the signal being received are saved in the sample vector formation block 12, preferably as complex sample vectors p(1), p(2) . . . p(N).

Also in this embodiment, the correlation step can be partly performed already during sampling, or after N sample vectors p(1), p(2) . . . p(N) have been formed. If the correlation step is performed in such a manner, for instance, that a time-to-frequency transform is calculated for each sample vector after it has been saved, preferably with a fast Hartley transform (FHT), the same time-to-frequency transformer can be used in all N sample vectors p(1), p(2) . . . p(N). But if the correlation step is performed after the saving of N sample vectors, a separate time-to-frequency transformer must be used for each sample vector, or the time-to-frequency transforms are performed consecutively for different sample vectors in the same time-to-frequency transformer. In this embodiment, the correlation step is performed in the calculation server 26. Then the values of the samples of the sample vectors and the time data of the electronic device 24 are sent preferably by means of the radio part 22 of the mobile station to the mobile communication network. In the mobile communication network, these data are received in the base station 25 and transmitted to the calculation server 26, where they are moved for processing to the block which performs the correlation step, depicted by the synchronization block 6 in FIG. 6. A correlation function matrix $C_x$ is formed of the sample vectors p(1), p(2) . . . p(N) in the manner specified in connection with the description of the method according to the first preferred embodiment of the invention.

A discrete Hartley transform 102, most suitably a fast Hartley transform, is performed on each sample vector p(1), p(2) . . . p(N) in accordance with the formula (4) presented above in this specification.

The reference codes r(x) of preferably all satellites of the GPS system (not shown), which correspond to the C/A code, have been saved in the calculation server 26, or they are generated in the calculation server 26. The reference code of the satellite to the signal of which the receiver is being synchronized is selected or generated each time in the correlation step. The reference code is temporally inverted.

This inverse reference code, which is denoted by $\bar{r}(x)$ in FIG. 2, is treated with a discrete Hartley transform 103, most suitably a fast Hartley transform, in accordance with the formula (5) presented above in this specification.

A multiplication 104 between the Hartley transform result P(i) of each sample vector p(i) and the Hartley transform $\bar{R}(x)$ of the inverse reference code $\bar{r}(x)$ is performed next in the correlation step in accordance with the formula (6) presented above in this specification.

Finally, an inverse Hartley transform 105 (IFHT) is performed on the results of these multiplications, resulting in a cross-correlation of the reference code r(x) and the received signal with all possible integer delays (1023) (formula 7).

In the analysis step, a Hartley transform is performed on each row of the transpose of this correlation function matrix $C_x$ for forming a coherent search matrix $A_x$, whereby a frequency analysis can be performed for determining the real frequency shift.

If necessary, an incoherent summing step can be performed in the synchronization block 6 to improve the signal-to-noise ratio. In order to implement the incoherent summing step, the sample vector formation step, the correlation step and the analysis step described above are repeated K times (not shown). This number of repetitions K is preferably selected such that the signal-to-noise ratio can be improved sufficiently, but in a reasonable time.

The values of the elements $A_x$ of the search matrix $a_x(i,j)$ are examined in the acquisition step, and the objective is to find 110 a value, which is probably caused by a signal transmitted by a satellite. If such a value is found, the calculation server 26 transmits information of the code phase and the frequency shift to the electronic device 24. But if no such value is found in the search matrix $A_x$, which means that a signal transmitted by the satellite searched for was probably not received in the frequency range examined, the frequency range to be examined is changed, and the above mentioned steps are carried out for forming a search matrix. In order to achieve this, the calculation server 26 transmits to the electronic device 24 information that no signal of the satellite was detected in the frequency range being examined, whereupon the receiver 1 of the electronic device preferably changes the frequency range to be examined and starts performing the steps presented above in this changed frequency range. With this method, the whole band of 6 kHz can be examined by repeating the steps described above as many times as required.

When required, the steps described above can be repeated for the whole frequency range to be examined, and the search matrices formed in the calculation server 26 at different times of repetition or only the possible peaks can be saved before searching for the highest correlation peak. Then the possibility of false interpretations can be reduced in such a situation, for instance, that the threshold value has been set too small and a spurious signal can cause a false interpretation.

The method according to another preferred embodiment of the invention is especially efficient because, among other reasons, there is a very small inaccuracy in the location readings of the calculation server 26 used for location determination, less than one millimeter in practice. This is due to the fact that the location determination server is located in a place known exactly (a base station, for example), and it usually has the Ephemeris data and almanac data of the satellites available each time.

Thus one basic idea of network-based positioning is to implement all demanding calculations in a calculation server 26 or a corresponding device located in the data transfer network. The receiver 1 of an electronic device must then become locked to the signal of at least four satellites and add time information to their code signals for calculating pseudoranges. After this, the electronic device 24 transmits signals to the calculation server 26 for calculating the actual location.

In network-based positioning, the receiver 1 may consist, at the minimum, of only the equipment required for carrying out the chip and code phase measurement and for transmitting the measurement results via the network to the server.

Although the invention was described above mainly in connection with the synchronization of the receiver, it is obvious that the invention can also be applied in connection with maintaining the synchronization.

The present invention is not limited to the above described embodiments only, but its details can be modified without departing from the scope defined by the attached claims.

The invention claimed is:

1. A method for performing the operations for synchronizing a positioning receiver with a received code-modulated spread spectrum signal, the method comprising:
   using at least one reference code, which reference code corresponds to a code used in the modulation, acquiring the frequency shift of the received signal and the code phase of the code used in the modulation,
   taking samples from the received signal for forming at least two sample vectors,
   forming a first Fast Hartley transform on the basis of said reference code, and a second Fast Hartley transform on the basis of each sample vector,
   performing a multiplication between the first Fast Hartley transform formed on the basis of said reference code and the second Fast Hartley transform formed on the basis of each sample vector,
   performing an inverse Fast Hartley transform on each multiplication result, and
   acquiring the frequency shift and code phase on the basis of the inverse Fast Hartley transforms of the multiplication results,
   wherein in said sample vector formation, correlation and analysis are repeated for forming at least two coherent search matrixes, and a summing is also performed in the method, in which summing an incoherent search matrix is formed by summing incoherently the values of the equivalent elements of the coherent search matrix formed at each time of repetition, and said incoherent search matrix is used in said acquisition for acquiring the frequency shift and code phase.

2. A method according to claim 1, wherein the frequency range to be examined is specified, the specified frequency range is divided into two or more parts, whereupon said sample vector formation and correlation are performed on each part, the method also comprises an analysis, in which values of the inverse Fast Hartley transforms of the multiplication results are saved for forming a coherent search matrix, the acquisition is performed after the examination of the specified frequency range, and the frequency shift and code phase are acquired on the basis of the highest value of the coherent search matrix.

3. A method according to claim 2, wherein a threshold value is specified, and quantity values of the elements of the coherent search matrix that exceed said threshold value are used in the acquisition for acquiring the frequency shift and code phase.

4. A method according to claim 1, wherein the frequency range to be examined is specified, the specified frequency range is divided into two or more parts, whereupon said sample vector formation, correlation, analysis and summing are performed on each part, and values of the elements of the incoherent search matrix are saved, and the acquisition is performed after the examination of the specified frequency range, and the frequency shift and code phase are acquired on the basis of the highest value.

5. A method according to claim 1, wherein a threshold value is determined, and quantity values of the elements of the incoherent search matrix that exceed said threshold value are used in the acquisition for acquiring the frequency shift and code phase.

6. A method according to claim 1, wherein an inverse code corresponding to said reference code is used in the correlation to form the first Fast Hartley transform.

7. A method according to claim 1, wherein an inverse code corresponding to each sample vector is used in the correlation to form the second Fast Hartley transform.

8. A positioning system, which comprises at least a positioning receiver, a synchronizer means for performing synchronization operations to a received code-modulated spread spectrum signal, said synchronizer is configured to use at least one reference code in connection with the synchronization, which reference code corresponds to a code used in the modulation, and an acquisition element configured to acquire the frequency shift of the received signal and the code phase of the code used in the modulation, wherein the synchronizer comprises:
   a sample vector formation circuit configured to form at least two sample vectors from the received signal,
   a correlator comprising
      a time-to-frequency transformer configured to forming a first Fast Hartley transform on the basis of said reference code, and to form a second Fast Hartley transform on the basis of each sample vector,
      a multiplier configured to perform a multiplication between the first Fast Hartley transform formed on the basis of said reference code and the second Fast Hartley transform formed on the basis of each sample vector, and
      an inverse Fast Hartley transformer configured to perform an inverse Fast Hartley transform on each multiplication result for forming a correlation function matrix, and
   an acquisition element configured to acquire the frequency shift and code phase by using the values of the inverse Fast Hartley transforms of the multiplication results,
   wherein said synchronizer is configured to repeat said formation of sample vectors, formation of a correlation function matrix and formation of a coherent search matrix at least two times for forming a coherent search matrix, and the receiver also comprises a summing element configured to form an incoherent search matrix by summing the values of the equivalent elements of the coherent search matrix formed at each time of repetition, and said acquisition element is configured to use said incoherent search matrix in determining the frequency shift and code phase.

9. A positioning system according to claim 8, wherein the received signals are signals transmitted by satellites of the GPS system.

10. A positioning system according to claim 8, which comprises a data transfer network, and at least part of the synchronizer is formed in connection with the data transfer network, and a data transfer connection is arranged to be established between the data transfer network and the receiver.

11. A positioning system according to claim 10, wherein the data transfer network comprises a mobile communication network.

12. A positioning system according to claim 8, wherein the synchronizer is formed in the receiver.

13. A positioning receiver, which comprises at least a synchronizer for performing synchronization operations to a received code-modulated spread spectrum signal, said synchronizer is configured to use at least one reference code in connection with the synchronization, the reference code corresponding to a code used in the modulation, and an acquisition element configured to acquire the frequency shift of the received signal and the code phase of the code used in the modulation, the synchronizer comprising:
  a sample vector formation circuit configured to form at least two sample vectors from the received signal,
  a correlator comprising a time to frequency transformer configured to form a first Fast Hartley transform on the basis of said reference code, and to form a second Fast Hartley transform on the basis of each sample vector, a multiplier configured to perform a multiplication between the first Fast Hartley transform formed on the basis of said reference code and the second Fast Hartley transform formed on the basis of each sample vector, and an inverse Fast Hartley transformer configured to perform an inverse Fast Hartley transform on each multiplication result for forming a correlation function matrix, and
  an acquisition element configured to acquire the frequency shift and code phase by using the values of the inverse East Hartley transforms of the multiplication results,
wherein said synchronizer is configured to repeat said formation of sample vectors, formation of a correlation function matrix and formation of a coherent search matrix at least two times for forming a coherent search matrix, and the receiver also comprises a summing element configured to form an incoherent search matrix by summing the values of the equivalent elements of the coherent search matrix formed at each time of repetition, and said acquisition element is configured to used said incoherent search matrix in determining the frequency shift and code phase.

14. A receiver according to claim 13, further comprising:
  a circuit configured to specify the frequency range to be examined, a circuit configured to divide the specified frequency range into two or more parts, whereupon the formation of the sample vectors and the formation of the correlation function matrix are arranged to be performed for each part,
  a circuit configured to forming a coherent search matrix,
  a circuit configured to save the values of the elements of the coherent search matrix, and
  a circuit configured to determine the frequency shift and code phase on the basis of the highest value of the coherent search matrix.

15. A receiver according to claim 13, further comprising a circuit configured to specify the threshold value, and a circuit configured to compare the values of said threshold value and the values of said coherent search matrix for determining the frequency shift and code phase.

16. A receiver according to claim 13, further comprising:
  a circuit configured to specify the frequency range to be examined,
  a circuit configured to divide the specified frequency range into two or more parts, whereupon the formation of the sample vectors and the formation of the correlation function matrix are arranged to be performed for each part,
  a circuit configured to form a coherent search matrix,
  a circuit configured to sum the coherent search matrix to the incoherent search matrix,
  a circuit configured to save the values of the elements of the incoherent search matrix, and
  a circuit configured to determine the frequency shift and code phase on the basis of the highest value.

17. A receiver according to claim 16, further comprising a circuit configured to specify the threshold value, and a circuit configured to compare the values of said threshold value and the values of said incoherent search matrix for determining the frequency shift and code phase.

18. A receiver according to claim 13, wherein the correlator comprises a circuit configured to form a Fast Hartley transform of the inverse code corresponding to said reference code.

19. A receiver according to claim 13, wherein the correlator comprises a circuit configured to form a Fast Hartley transform of the inverse code corresponding to each sample vector.

20. An electronic device, which comprises at least a location determination positioning receiver, a synchronizer for performing synchronization operations of the location determination receiver to a transmitted code-modulated spread spectrum signal, and in which the location determination receiver is configured to use at least one reference code in connection with the synchronization, the reference code corresponds to a code used in the modulation, and the electronic device comprises an acquisition element configured to determine the frequency shift of the transmitted signal and the code phase of the code used in the modulation, wherein the synchronizer comprises:
  sample vector formation circuit configured to form at least two sample vectors from the received signal,
  correlator comprising a time-to-frequency transformer configured to form a first Fast Hartley transform on the basis of said reference code, and to form a second Fast Hartley transform on the basis of each sample vector, a multiplier configured to perform a multiplication between the first Fast Hartley transform formed on the basis of said reference code and the second Fast Hartley transform formed on the basis of each sample vector, and an inverse Fast Hartley transformer configured to perform an inverse Fast Hartley transform on each multiplication result for forming a correlation function matrix, and
  acquisition element configured to acquire the frequency shift and code phase by using the values of the inverse Fast Hartley transforms of the multiplication results,
wherein said synchronizer is configured to repeat said formation of sample vectors, formation of a correlation function matrix and formation of a coherent search matrix at least, two times for forming a coherent search matrix, and the receiver also comprises a summing element configured to form an incoherent search matrix by summing the values of the equivalent elements of the coherent search matrix formed at each time of repetition, and said acquisition element is configured to use said incoherent search matrix in determining frequency shift and code phase.

21. An electronic device according to claim 20, which comprises a circuit configured to determine the location of the electronic device and a circuit configured to save the location information, wherein the electronic device also comprises a circuit configured to specify the frequency range to be examined, and a circuit configured to select the starting frequency from said frequency range on the basis of the location information saved in the receiver.

22. An electronic device according to claim 20, wherein the correlator comprises a circuit configured to form a Fast Hartley transform of the inverse code corresponding to said reference code.

23. An electronic device according to claim 20, wherein the correlator comprises a circuit configured to form a Fast Hartley transform of the inverse code corresponding to each sample vector.

24. An electronic device according to claim 20, further comprising a circuit configured to perform data transfer operations.

25. An electronic device according to claim 24, further comprising a circuit configured to establish a data transfer connection to a data transfer network, and a circuit configured to determine the location of the electronic device including a circuit configured to transmit information needed in the location determination to the data transfer network, and a circuit configured to retrieve information used in the location determination from the data transfer network, whereby at least part of the location determination operations are arranged to be performed in the data transfer network.

26. An electronic device according to claim 24, wherein the circuit configured to perform data transfer operations comprises a circuit configured to perform mobile station operations.

27. An electronic device, which comprises at least a positioning receiver and which electronic device is intended for use in connection with a positioning system, which comprises a synchronizer for performing synchronization operations of the receiver to a transmitted code-modulated spread spectrum signal, said synchronizer is configured to use at least one reference code in connection with the synchronization, the reference code corresponding to a code used in the modulation, a circuit configured to determine the frequency shift of the transmitted signal and the code phase of the code used in the modulation, and a data transfer network, wherein the electronic device also comprises a sample vector formation circuit configured to form at least two sample vectors from the received signal, and a transmitter for transmitting the sample vectors and time information to the data transfer network, and the positioning system also comprises:

a correlator comprising a time-to-frequency transformer configured to form a first Fast Hartley transform on the basis of said reference code, and to form a second Fast Hartley transform on the basis of each sample vector, a multiplier configured to perform a multiplication between the first Fast Hartley transform formed on the basis of said reference code and the second Fast Hartley transform formed on the basis of each sample vector, and an inverse Fast Hartley transformer configured to perform an inverse Fast Hartley transform on each multiplication result for form a correlation function matrix, and an acquisition element configured to acquire the frequency shift and code phase by using the values of the inverse Fast Hartley transforms of the multiplication results, wherein said synchronizer is configured to repeat said formation of sample vectors, formation of a correlation function matrix and formation of a coherent search matrix at least two times for forming a coherent search matrix, and the receiver also comprises a summing element configured to form an incoherent search matrix by summing the values of the equivalent elements of the coherent search matrix formed at each time of repetition, and said acquisition element is configured to use said incoherent search matrix in determining the frequency shift and code phase.

28. An electronic device according to claim 27, further comprising a circuit configured to receive information about the acquired frequency shift and code phase from the data transfer network.

29. An electronic device according to claim 27, which is intended for use in connection with a positioning system, and which also comprises a circuit configured to determine the location of an electronic device, and a circuit configured to receive location information from the data transfer network.

30. An electronic device according to claim 27, wherein the data transfer network comprises a circuit configured to perform mobile station operations.

31. A positioning receiver, which comprises at least synchronization means for performing synchronization operations to a received code-modulated spread spectrum signal, said receiver has means for using at least one reference code in connection with the synchronization, the reference code corresponding to a code used in the modulation, and means for acquiring the frequency shift of the received signal and the code phase of the code used in the modulation, the synchronization means comprising:

sample vector formation means for forming at least two sample vectors from the received signal, correlation means for forming a first Fast Hartley transform on the basis of said reference code, and for forming a second Fast Hartley transform on the basis of each sample vector, means for performing a multiplication between the first Fast Hartley transform formed on the basis of said reference code and the second Fast Hartley transform formed on the basis of each sample vector, and means for performing an inverse Fast Hartley transform on each multiplication result for forming a correlation function matrix, and acquisition means for acquiring the frequency shift and code phase by using the values of the inverse Fast Hartley transforms of the multiplication results, wherein in said formation of sample vectors, formation of a correlation function matrix and formation of a coherent search matrix are arranged to be repeated at least two times for forming a coherent search matrix, and the receiver also comprises summing means for forming an incoherent search matrix by summing the values of the equivalent elements of the coherent search matrix formed at each time of repetition, and said incoherent search matrix is used in the acquisition for determining the frequency shift and code phase.

* * * * *

UNITED STATES PATENT AND TRADEMARK OFFICE
CERTIFICATE OF CORRECTION

PATENT NO. : 7,151,793 B2
APPLICATION NO. : 09/732828
DATED : December 19, 2006
INVENTOR(S) : Mannermaa It is certified that error appears in the above-identified patent and that said Letters Patent is hereby corrected as shown below:

Col. 14, line 20, after "synchronizer" delete "means".

Col. 15, line 17, delete "time to frequency" and insert -- time-to-frequency --, therefor.

Col. 15, line 31, delete "East" and insert -- Fast --, therefor.

Col. 15, Line 51, delete "forming" and insert -- form --, therefor.

Col. 16, line 56, delete "least," and insert -- least --, therefor.

Col. 16, line 62, after "determining" insert -- the --.

Col. 17, line 57, delete "form" and insert -- forming --, therefor.

Signed and Sealed this

Thirtieth Day of October, 2007

JON W. DUDAS
*Director of the United States Patent and Trademark Office*